BENJAMIN W. DEAL, OF NEW MARKET, MARYLAND.

Letters Patent No. 88,554, dated April 6, 1869.

IMPROVED MEDICINE FOR CURE OF THE GRAVEL.

The Schedule referred to in these Letters Patent and making part of the same.

*To all whom it may concern:*

Be it known that I, BENJAMIN W. DEAL, of New Market, Frederick county, Maryland, have invented an Improved Medicine for Curing the Gravel; and I do hereby declare the following to be a full, clear, and exact description of the same.

My improved medicine is composed of yarrow, rosin, and horseradish, or other root or substance having similar qualities, the articles being formed into a liquid composition with water, in the following manner:

Two ounces of yarrow, one ounce of rosin, and one-half an ounce of horseradish are placed in one and one-half gallon of water, and the mixture is boiled until reduced in quantity to one gallon. It is then strained, cooled, and bottled, when it is ready for use, being administered in doses of one gill, four times daily.

I have found that the most obstinate cases of gravel are cured by administering the above-described medicine for not longer than two months, although, in most instances, two weeks will be sufficient time in which to effect permanent relief.

The proportion of the materials may be modified without impairing the efficiency of the medicine.

I claim as my invention, and desire to secure by Letters Patent—

A medicine for curing the gravel, made substantially as described.

In testimony whereof, I have signed my name to this specification, in the presence of two subscribing witnesses.

B. W. DEAL.

Witnesses:
    CHARLES E. FOSTER,
    EDM. F. BROWN.